Nov. 15, 1949  R. J. SOULIGNE  2,487,950
DUAL WHEEL DOLLY

Filed Jan. 13, 1948  2 Sheets-Sheet 1

INVENTOR.
Raymond J. Souligne
BY
McMorrow, Berman & Davidson
Attorneys

Nov. 15, 1949  R. J. SOULIGNE  2,487,950
DUAL WHEEL DOLLY

Filed Jan. 13, 1948  2 Sheets-Sheet 2

INVENTOR.
Raymond J. Souligne
BY
McMorrow, Berman & Davidson
Attorneys

Patented Nov. 15, 1949

2,487,950

UNITED STATES PATENT OFFICE 2,487,950

DUAL WHEEL DOLLY

Raymond J. Souligne, Goodland, Ind.

Application January 13, 1948, Serial No. 2,062

2 Claims. (Cl. 280—35)

This invention relates to improvements in dollies for handling heavy wheels of motor vehicles, and more particularly to a dolly for removing and replacing dual wheels on such vehicles, the primary object of the invention being to provide a device of this character which enables the largest and heaviest dual wheels to be easily and quickly removed from and replaced on the vehicle axle hub by one man, and without the use of pry bars and other tools ordinarily associated with the operation.

Another important object of the invention is the provision of a device of the above-indicated character which can be readily adjusted to accommodate dual wheels of different sizes.

Another important object of the invention is to provide a device of the character indicated above by means of which a dual wheel can be removed from the axle bearing assembly in a straight-line pull and put back on with a straight-line push easily and quickly and without any lifting effort on the part of the one man operating the device.

Other important objects and advantageous features of the invention will be apparent from the following description and appended drawings, wherein, for purposes of present illustration only, a specific embodiment of the invention is set forth in detail.

Figure 1:
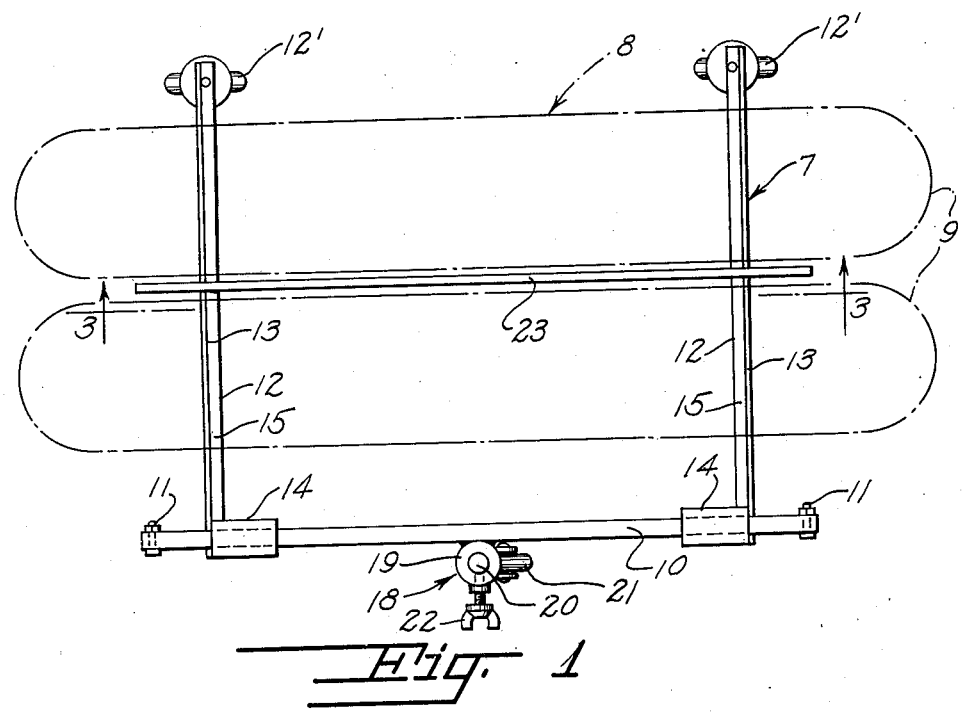
Figure 1 is a top plan view showing in dotted lines a dual wheel supported on the device.

Referring in detail to the drawings, the illustrated dolly, generally designated 7, for supporting and carrying a dual wheel 8 composed of two tired wheel elements 9, 9, comprises a rectangular cross-section front bar 10 having sets of lateral stops 11, 11 on opposite ends conveniently in the form of headed bolts and nuts; two similar facing and parallel angle iron cross-members 12, 12, with the vertical flanges 13 thereof securably engaged with the laterally outward ends of elongated slide bearings 14, 14 having square bores slidably receiving the front bar 10 between the stops 11, 11 and with their horizontal flanges 15 secured to the under side of the slide bearings near their laterally outward ends, supporting blocks 6 being welded between the flanges 15 and the under side of slide bearings 14, whereby the cross-members 12, 12 extend rearwardly at right angles from the front bar 10 and can be adjusted therealong between the stops 11, 11 without rotation relative to the bar 10. Each slide bearing 14 has a vertical set screw 16 projecting upwardly to engage with the underside of the front bar 10 to enable locking the slide bearing in an adjusted position therealong.

The rearward ends of the cross-members 12, 12 have depending caster wheels 12' which support the same a small distance above the ground 17. The front bar 10 has thereon a vertically-adjustable caster wheel assembly 18 comprising a vertical sleeve 19 secured, as by welding, to the middle of the bar 10 at its front side, a vertical spindle 20 slidable in said sleeve and having a laterally offset caster wheel 21 vertically pivoted on its lower end, with a forwardly-projecting horizontal set screw 22 threaded through the sleeve 19 for engagement with the spindle 20 to lock the spindle in selected vertical adjustment.

Figure 2:
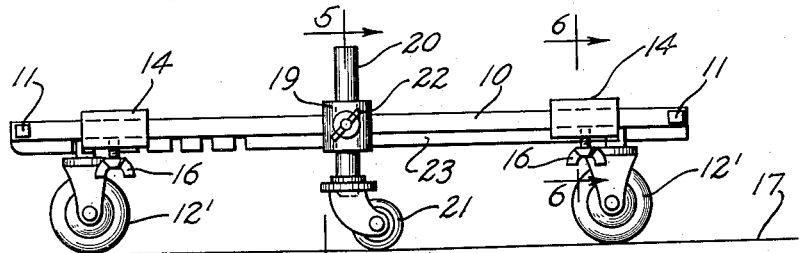
Figure 2 is a front elevation.
Figure 3:
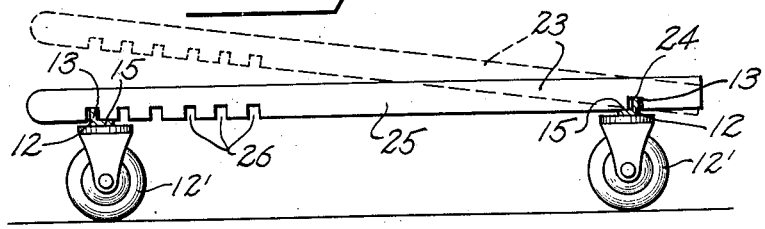
Figure 3 is a vertically longitudinal section taken on the line 3—3 of Figure 1.
Figure 4:
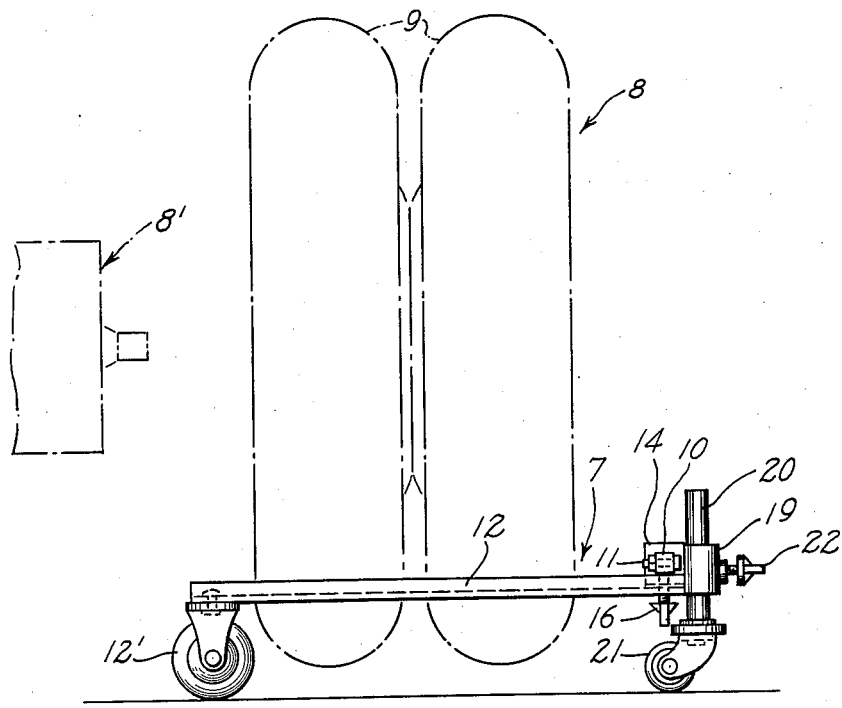
Figure 4 is a left-hand end elevation showing a dual wheel supported on the device.
Figure 6:
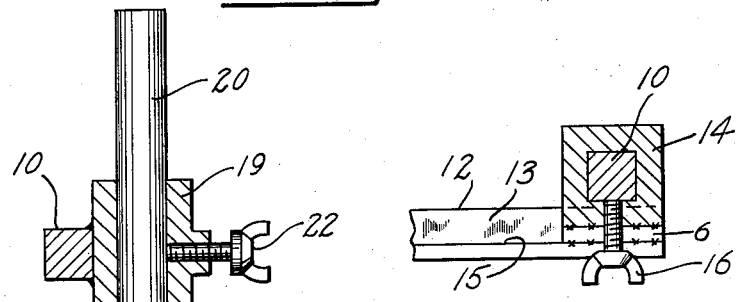
Figure 6 is an enlarged transverse vertical section taken on the line 6—6 of Figure 2.
Figure 5:
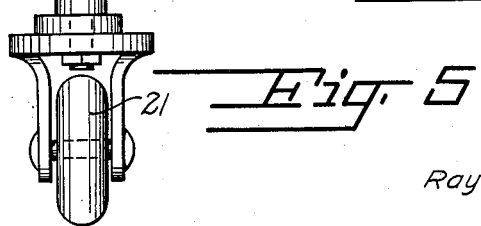
Figure 5 is an enlarged transverse vertical section taken on the line 5—5 of Figure 2.

A flat retaining or anti-spreading bar 23 having a single notch 24 at one end of its lower edge 25 for engagement over the vertical flange 13 of one of the cross-members 12, 12, has a plurality of similar notches 26 at its opposite end for selective engagement with the vertical flange 13 of the remaining cross-member 12 in the manner shown in full and in dotted lines in Figure 2 of the drawings, as hereinafter set forth.

In employing the device of the invention, the dual wheel 8 having been elevated from the ground 17 by jacking up the vehicle so that the tires 9, 9 clear the ground from one to two inches, the notched bar 23 is removed from the rails or cross-members 12, and the cross-members moved along the squared bar 10 until they are in position to engage opposite sides of the under part of the tires 9, 9. The entire device is then pushed under the dual wheel with the rails 12, 12 engaging the sides of the tires until the rear wheels 12', 12' are behind the inboard side of the inner tire 9.

The notched bar 23 is then passed into the space between the tires 9, 9 and the single notch 24 engaged with the upstanding flange 13 of one of the rails 12. The rails 12, 12 are then pushed tight up against the corresponding sides of the under part of the tires, and the corresponding one of the plurality of notches 26 is then engaged with the upstanding flange 13 of the other rail 12 and the set screws 16 on the rail sleeves 14 are tightened, whereby the rails will be held tight against the tires and prevented from subsequently spreading apart as the weight of the dual wheel is placed thereon. The front wheel assembly set screw 22 is then loosened, and with the wheel 21 resting on the ground 17, the square rod 10 is lifted to a level at which the rails 12, 12 engage the sides of the under part of both tires, in the event that, due to jacking up of the vehicle, the tires are not at the same level, and for the purpose of assuring a straight-out pull of the dual wheel 8.

The dolly 7 having been adjusted to the wheel 8, as above described, the usual wheel nut and bearing (not shown) of the axle assembly 8' are removed and the jack (not shown) released just enough to free the wheel 8 from the axle assembly and so that only the weight of the wheel 8 is on the dolly 7. The dual wheel 8 is then ready to be pulled straight out away from the axle assembly 8' simply by pulling outwardly on the wheel or by pulling outwardly on the dolly, as may be convenient.

The wheel 8 can be put back on the axle assembly 8' after repair or replacement simply by running the dolly back into position and pushing the wheel and dolly to deposit the wheel on the axle assembly, no lifting of the wheel 8, employment of bars or other tools, or changing the jacked-up position of the vehicle being necessary.

I claim:

1. A dolly for supporting a dual wheel with its axis horizontal while removing and restoring the wheel on its axle assembly, said dolly comprising a front bar adapted to be positioned parallel to the vertical plane of the outboard side of the outboard tire of said dual wheel, a pair of transverse rails slidably mounted at their outboard ends on said front bar and arranged to be adjusted along said front bar into positions against opposite sides of the under part of both tires of said dual wheel, means for retaining said rails in adjusted positions, ground-engaging wheels on the rear ends of said rails for supporting said rails in supporting engagement with the said opposite sides of the under part of the inboard tire of said wheel, a vertically-adjustable caster wheel on said front bar enabling elevating said front bar to a position in which said rails engage the side under parts of both tires of said dual wheel, means for locking said caster wheel in adjusted positions, and an anti-spread bar for positioning in the space between the inboard and outboard tires of said dual wheel and between said rails having means for connecting said anti-spread bar to said rails for preventing spreading of said rails by the weight of the dual wheel thereon when removed from its axle assembly, said transverse rails comprising angle irons having horizontal and vertical flanges, and said anti-spread bar being formed with a plurality of notches in its lower edge selectively engageable with the vertical flanges of said rails.

2. A wheel dolly including a front horizontal bar, a pair of transverse rails slidably mounted on the front horizontal bar at their forward ends for lateral adjustment toward and away from each other and comprising angle irons having horizontal and vertical flanges, means for locking the transverse rails in adjusted positions upon said front horizontal bars, ground-engaging wheels on the rear ends of said transverse rails, a caster wheel on said front horizontal bar, and means enabling vertically adjusting said caster wheel relative to said front horizontal bar and locking said caster wheel in adjusted position, and an anti-spreading bar rearwardly spaced from said front bar and extending between and adjustably engaging both of said transverse rails to prevent spreading of the latter rails in different adjusted positions of said rails, said anti-spread bar being formed with a plurality of notches in its lower edge selectively engageable with the vertical flanges of said transverse rails, and said front bar being of rectangular cross-section and said rails having rectangularly-bored sleeves fixed on their forward ends slidably and non-rotatably receiving said front horizontal bar.

RAYMOND J. SOULIGNE.

REFERENCES CITED

The following references are of record in the file of this patent:

UNITED STATES PATENTS

| Number | Name | Date |
|---|---|---|
| 1,083,982 | Blessing | Jan. 13, 1914 |
| 1,482,954 | Tideman | Feb. 5, 1924 |
| 2,252,534 | Trotter | Aug. 12, 1941 |
| 2,332,443 | Foringer | Oct. 19, 1943 |
| 2,436,647 | Huey | Feb. 24, 1948 |